UNITED STATES PATENT OFFICE.

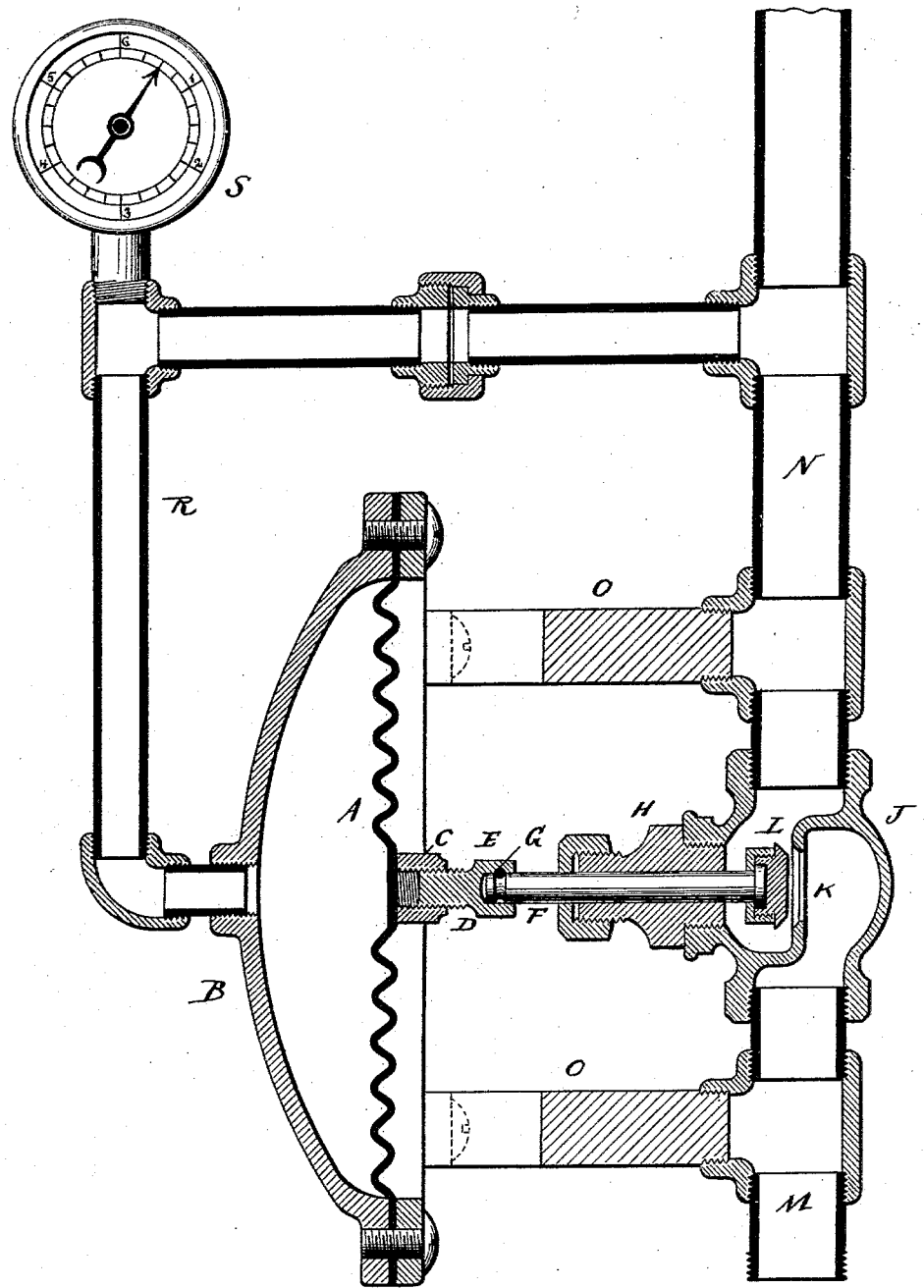

GUSTAV SCHMIDT, OF BROOKLYN, AND JOHN CHRIST, OF NEW YORK, N. Y.

AUTOMATIC PRESSURE-REGULATOR.

SPECIFICATION forming part of Letters Patent No. 369,474, dated September 6, 1887.

Application filed March 17, 1887. Serial No. 231,231. (No model.)

*To all whom it may concern:*

Be it known that we, GUSTAV SCHMIDT, of Brooklyn, in the county of Kings and State of New York, and JOHN CHRIST, of the city of New York, county and State of New York, have invented certain new and useful Improvements in Automatic Pressure-Regulators, of which the following is a specification.

The object of our invention is to provide a new and improved automatic regulator for air, gas, steam, water, &c.

The invention consists in the combination, with a casing in which a diaphragm is held, of a screw-socket on the diaphragm, a valve-stem connected with said screw-socket, a valve-casing having a seat for the above-mentioned valve, and conducting-pipes connected with the diaphragm-casing, all as will be fully described and set forth hereinafter, and finally pointed out in the claim.

In the accompanying drawing a cross-sectional view of our improved pressure-regulator is shown.

The corrugated or other sheet-metal diaphragm A is held at its edges in the casing B, so as to form an absolutely air-tight joint. On the outer side of the diaphragm A a metal socket, C, is secured, into which the screw-threaded end D of a piece, E, is held, said piece having a square head to permit of applying a key or other implement for turning it. In said socket one end of a valve-stem, F, is held, having an annular groove, into which a pin, G, passes, thereby forming a joint which permits of the stem swinging slightly on the piece E. The valve-stem is passed through the usual neck, H, of the valve-casing J, having a seat, K, for a valve, L, on the inner end of the stem F. Said valve-casing J is provided with pipes M and N, through which the compressed air, steam, gas, or water passes, said pipes being provided with the arms O, for supporting the casing B. A branch pipe extends from the tube N above the casing, and is connected with the interior of the casing B, which branch pipe may be provided with a pressure-gage, S. If it is desired that the pressure in the receptacle connected with the pipe M shall be, for instance, fifteen pounds, the valve L is so adjusted that it closes the aperture in the valve-casing J at said pressure of fifteen pounds. If the pressure in the pipe N is less than fifteen pounds, the exterior air presses the diaphragm inward, thereby moving the valve from its seat and thereby permitting the compressed air, steam, or gas in the pipe M to pass into and through the pipe N, which compressed air or gas passes through the branch pipe R into the casing B and presses the diaphragm outward, thereby closing the port in the valve-casing and preventing an undue pressure—that is, a pressure of above fifteen pounds—in the pipe N and the receptacle connected therewith.

As the valve opens automatically and is also closed automatically, there is never less than fifteen pounds pressure or more than fifteen pounds pressure in the receptacle connected with the pipe N. The valve can be adjusted to any desired pressure by turning the piece D, whereby the valve-stem F is moved longitudinally toward or from the port K. When it is desired to have a greater pressure in the pipe N and the receptacle connected therewith, the valve L must be moved from its seat—that is, the piece D must be screwed inward—and when it is required to have less pressure the piece D must be screwed outward.

Having thus described our invention, we claim as new and desire to secure by Letters Patent—

In a pressure-regulator, the combination, with a pipe provided with a valve-casing, of a valve and stem in said casing, a diaphragm-casing in which the diaphragm is held, a pipe connecting the casing of the diaphragm with the pipe connected with the vessel or receptacle in which the desired pressure is to be provided, a screw-socket on the outer or exposed surface of the diaphragm held in the above-mentioned casing, and a piece screwed into said socket, in which piece the stem of the valve is held, whereby by turning said piece the position of the valve in relation to its seat can easily be adjusted without requiring any parts of the valve to be taken apart, substantially as shown and described.

In testimony that we claim the foregoing as our invention we have signed our names in presence of two subscribing witnesses.

GUSTAV SCHMIDT.
JOHN CHRIST.

Witnesses:
PAUL GOEPEL,
CARL KARP.